United States Patent [19]

Keller et al.

[11] 4,226,801

[45] Oct. 7, 1980

[54] TERMINATED BIS(3,4-DICYANOPHENOXY) ALKANES

[75] Inventors: Teddy M. Keller, Alexandria, Va.; James R. Griffith, Riverdale Heights, Md.

[73] Assignee: The United States of America as represented by the Secretary of the Navy, Washington, D.C.

[21] Appl. No.: 51,568

[22] Filed: Jun. 25, 1979

[51] Int. Cl.³ ............................................. C07C 121/50
[52] U.S. Cl. ............................... 260/465 F; 260/314.5
[58] Field of Search ...................................... 260/465 F

[56] References Cited

U.S. PATENT DOCUMENTS

| | | | |
|---|---|---|---|
| 3,787,475 | 1/1974 | Heath et al. ...................... | 260/465 F |
| 4,108,906 | 8/1978 | Anderson ...................... | 260/465 F X |
| 4,154,850 | 5/1979 | Morgan et al. ............... | 260/465 F X |

*Primary Examiner*—Richard Raymond
*Attorney, Agent, or Firm*—R. S. Sciascia; Philip Schneider; Thomas McDonnell

[57] ABSTRACT

Terminated bis(3,4-dicyanophenoxy) alkanes, wherein the alkylene chain is from 2 to 30 carbon atoms in length, is prepared by the reaction of 4-nitrophthalonitrile with a terminated alkane diol at elevated temperatures. A polyphthalocyanine resin is obtained by heating the dicyanophenoxy alkanes neat or with a salt or metal at a temperature from about 180° C. to about 245° C. The polyphthalocyanine resin is useful as a high-temperature structural or composite material which is highly resistant to mechanical stresses and strains.

8 Claims, No Drawings

TERMINATED BIS(3,4-DICYANOPHENOXY) ALKANES

BACKGROUND OF THE INVENTION

The present invention pertains generally to high-temperature resins along with their precursors and in particular to dicyanophenoxy alkanes and the cyano-addition resins prepared therefore.

Fiber-reinforced composite materials are gaining greater acceptance as a metal substitute in structural applications because of weight savings, cost effectiveness and better properties, e.g. rust resistant. New design concepts are made possible by these easily fabricated, fiber-reinforced composites with superior stiffness and a high strength-to-weight ratio. The most significant advantage of these materials is the fuel savings for moving structures manufactured from these lightweight materials.

Fiber-reinforced composite materials comprise carbon or graphite fibers dispersed in a resin. Presently, the most widely used resins are epoxies and aromatic polyimides which have several disadvantages. Conventional epoxy-based composites are limited to a maximum service temperature of 120° C.; other problems associated with these composites include their brittleness, water absorptivity, and engineering reliability. While aromatic polyimides have a greater thermal stability than epoxy resins, their use has not been as extensive as epoxy resins because of their insolubility in organic solvents needed in synthesis, their poor reproducability on account of the release of water which often splits polymeric chains, trapped solvents in the final resin, and excessive stiffness.

Recently, a new class of resins has been obtained by polymerizing certain phthalonitrile terminated diamides, often referred to as amide-bridged bisorthodinitriles. The structure of these resins has not been completely confirmed, but for the following reasons, the principal mechanism of formation is theorized to be phthalocyanine nucleation. As the bisorthodinitriles polymerize, the color becomes progressively darker green in the manner similar to phthalocyanines. The polymerization is difficult to initiate and promote which indicates the formation of a large and complex nucleus such as the phthalocyanine nucleus by a large end group such as the phthalonitrile group. Examples of resins prepared from these bisorthodinitrile are disclosed in U.S. Pat. Nos. 4,056,560, 4,057,569, and 4,136,107 by James R. Griffith and Jacques G. O'Rear.

These resins with comparable structural strength have several advantages over epoxies and polyimides as structural materials. Their maximum service temperature stability in an oxygen-containing atmosphere is about 230° C., a temperature being over 100° C. greater than that for epoxies. Water absorptivity as measured by the water-soak method is much lower than that for epoxies. Some of the resins, depending on the bridging chain, have a much greater elastic modulus than epoxy and polyimides resins. These resins have many other advantages over polyimides due to an absence of solvents in their preparation, lower water absorptivity and not being thermoplastic with a low glass-transition temperature.

Many applications require a structural composite to have an elastic modulus high enough to withstand numerous mechanical stresses and strains over a long period of time. One application is the underbody of jet aircraft exposed to the back blast of jet engines, especially the V-STOL (vertical/standing take-off and landing) aircraft. Structural components of helicopters and automobile frames are also exposed to severe mechanical demands.

SUMMARY OF THE INVENTION

It is, therefore, an object of the present invention to provide a polyphthalocyanine resin which has an elastic modulus high enough to permit the use of the resin in the fabrication of structural components of aircraft, helicopters, and automobiles which are exposed to severe and/or constant mechanical stresses and strains.

A further object of the invention is to provide a cheaper and more hydrophobic polyphthalocyanine than the amide-bridged polyphthalocyanines.

Another object of the present invention is to provide a class of bisorthodinitriles (terminated dicyanophenoxy alkanes) which are polymerizable to polyphthalocyanine resins.

And another object of the present invention is to provide a method of synthesising these dicyanophenoxy alkanes inexpensively and in a high yield and purity.

These and other objects are achieved by preparing a terminated dicyanophenoxy alkane from the corresponding diol and 4-nitrophthalonitriles and by heating the alkoxy-bridged bisorthodinitrile to form a resin having flexible bridging chains.

DETAILED DESCRIPTION OF THE INVENTION

The resins of the present invention are characterized as polyphthalocyanines primarily on the basis of the progressively darkening of the green color as the resins are formed and the difficulty of initiating and promoting their formation. Also the phthalocyanine formation is a resonable mechanism in view of the dinitrile end groups of the precursor. It is on this basis that the phthalocyanine formation is believed to be the principal reaction. Other cyano-addition reactions may also be present; however, the resulting resin is a three-dimensional network polymer with exceptional uniformity in properties.

The resin with phthalocyanine nuclei has a structural formula:

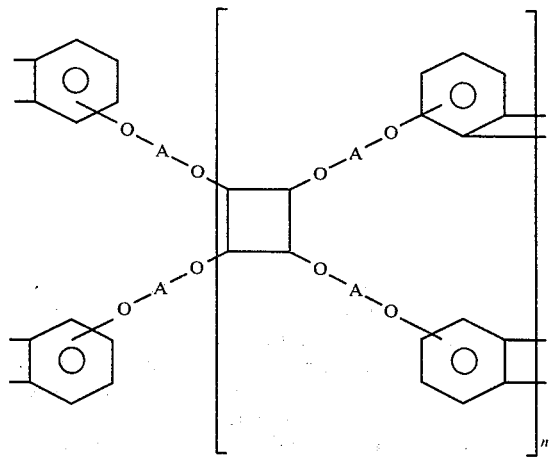

wherein

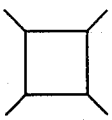

represents a phthalocyanine nucleus, A represents a branched or non-branched alkylene group with two to thirty carbon atoms in the primary chain, and n is any number. If the bridging chain is branched, no groups are attached at the α or β positions and no branch is longer than five carbon atoms. If the phthalocyanine is coordinated by a metal or salt, the phthalocyanine nucleus is represented by

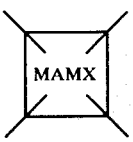

wherein M represents a metal and MX represents a salt. More detailed formulas of the two phthalocyanine nuclei are as follows:

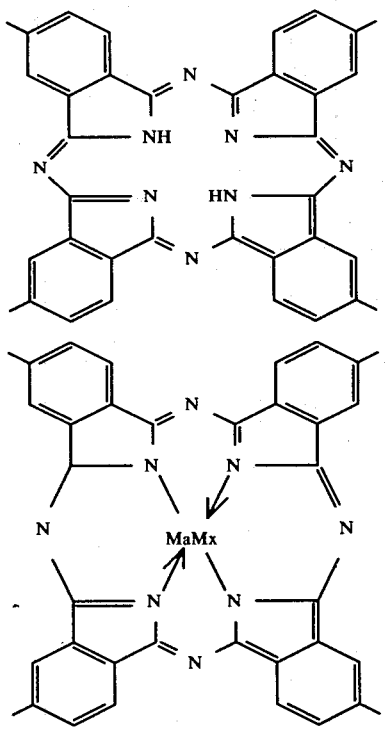

Hereinafter, the resins of this invention are designated as: $(PcO_4A_2)_n$ if neat, $(M.PcO_4A_2)_n$ if coordinated with a metal, and $(Mx.PcO_4A_2)_n$ if coordinated with a salt.

Resins with A representing $(CH_2)_x$ wherein x is from 15 to 30 have very high elastic moduli while still retaining, to a substantial degree, phthalocyanine properties. Resins with A representing $(CH_2)_x$ wherein x is from 2 to 10 are the least expensive and have the greatest stiffness. The remaining resins are excellent compromises between the first two groups of resins having unbranched alkylene bridges. Overall the preferred range for x is from 8 to 20 carbon atoms. If the bridges are branched to the degree that few primary-chain carbons are not branched, the resins are more thermally stable and less hydrophilic. As was mentioned previously, the α and β carbon can not be branched. The branching does not affect the elasticity of the resins and thus the relationship between chain and elasticity is same as before.

The preferred metals for coordinating the resin are copper, iron, zinc, and nickel due to the availability, handling, and desired reactivity and to the enchanced thermal stability of the resulting resin. Examples of other metals which may be used are chromium, molybdenum, vanadium, beryllium, silver, mercury, tin, lead, antimony, calcium, barium, manganese, cobalt, palladium, and platinum.

The preferred metallic salt for coordination is stannous chloride. This increases the reaction rate the most and has the least trouble with poor dispersion and voids caused by entrapped gas. These advantages occur only if the stannous chloride is dispersed by the method described hereinafter. Other suitable metallic salts include cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanine, nickel sulfate, nickel carbonate, stannic chloride, stannous chloride hydrate, a complex of triphenylphosphine oxide and mixtures thereof. Additional examples of metals and salts are found in Mosher, Frank H. and Thomas, Arther L. *Phthalocyanine Compounds*, N.Y. Reinhold, 1963, p. 104–141.

The dicyanophenoxyalkanes, from which the present polyphthalocyanines are prepared, have the structural formula:

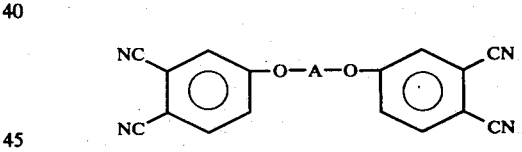

wherein A is an alkylene having a length from 2 to 30 carbon atoms. They are synthesized by a nitro-displacement reaction between a terminated alkanediol with 3- or 4-nitrophthalonitrile. Dicyanophenoxyalkanes can also be referred to as bisorthodinitriles. It is theorized that this surprising reaction occurs because the cyano groups on nitrophthalonitrile are sufficiently electron withdrawing to permit a nucleophilic displacement of the nitro group without being susceptible to the same displacement under the specified reaction conditions.

Essentially the reaction occurs at an elevated temperature in an anhydrous reaction medium comprising a base and a solvent under an inert atmosphere. The anhydrous base must have a dissociation constant greater than water, must not form any neutralizing acids, and must not compete with the alkoxide in the nitro displacement. Examples of suitable bases are potassium, sodium, or calcium carbonate, sodium, potassium, lithium, or calcium hydroxide, organolithium reagents such as methyl or n-butyl lithium, Grignard agents, and potassium or sodium bicarbonate. The solvent must be dipolar and aprotic, such as dimethylsulfoxide (DMSO), dimethylformamide (DMF), N-methyl pyrolidone (NMP) or N,N-dimethyl acetamide.

The diol and nitrophthalonitrile are preferably added in about stoichiometric amounts, i.e., in a diol-nitro mole ratio of 1:2. The solvent is added in an amount at least sufficient to dissolve the reactants and product. An amount in slight excess of the stocihiometric amounts, i.e. in a diol-base mole ratio of 1:2 of base increases the reaction rate and yield. This effect is particularly so with the carbonate and bicarbonate bases. With these bases, an amount from 10 to 25 mole percent in excess of the stoichiometric amount is generally used. It should be noted that excess base can become trapped in the product; so, extra care in the workup and purification of product should be used whenever an excess of base is used.

If the base is a hydroxide, water is formed by the reaction of the base with the protic proton of the diol. Since the cyano groups react with hydroxide in the presence of water, it is necessary to remove all water from the reaction mixture before adding the nitrophthalonitrile reactant. For this reason, the method utilizing a hydroxide base requires the initial steps of mixing the solvent, base, diol and a refluxing liquid, e.g., benzene or toluene until all water (as determined by the stoichiometric equation) has been removed and cooling the solution to about room temperature before adding in the nitrophthalonitrile in order to obtain an anhydrous reaction solution. After the nitrophthalonitrile has been added, the reaction solution is slowly heated to a temperature from about 50° to about 150° C. and preferably from 100° C. to 150° C. and the heating is maintained until the reaction is complete as determined by e.g., monitoring the $NO_2$ absorption with an i.r. analyser. Next the reaction solution is cooled to about room temperature and poured into cold water (about 10° C. or less). This product is extracted by any common organic solvent, e.g., chloroform, methylene chloride, or ethyl ether.

If the base is carbonate or bicarbonate, the reactants, base, and solvent are added in one step and the method proceeds as before except that the reaction solution is poured into cold dilute hydrochloric acid (2 N or less and 15° C. or less). This yield can be increased if the carbonate or bicarbonate is added in increments with no increment being larger than one-third of the total base.

The difficulty of initiating and promoting the polymerization of the above terminated dicyanophenoxyalkanes depends on the length of the bridging chain, which determines the amount of separation between the dinitrile end groups and the range with which they can move. For short bridging chains (2 to 6 carbon atoms in the primary chain), neat polymerization requires a polymerization temperature of above 200° C. in order to polymerize the nitrile precursor within two days. Dicyanophenoxyalkanes with bridging chains longer than six carbons require progressively lower temperatures, those with more than 15 carbon atoms in the bridging chain being capable of polymerization in a short period of time. The maximum polymerization temperature is about 245° C. Regardless of the temperature, the heating is continued until the melt solidifies to an extremely hard material. Polymerization can be carried out in an oxygen-containing, inert, or vacuum atmosphere. Often a post cure at a temperature from 210° to 240° C. is used to improve the strength of the resin.

The terminated dicyanophenoxyalkanes can be polymerized stepwise to distinct stages. By the preferred method, the material is reacted to the B-stage as a distinct step before polymerizing to the C-stage. The method comprises heating a dicyanophenoxyalkane to about 160° C. and then slowly raising the temperature to about 180° C. to about 240° C. until the viscosity starts to increase due to the onset of phthalocyanine formation which is called the B-stage. At the B-stage, the material can be cooled to a frangible solid and can be stored indefinitely without further reaction. The C-stage is obtained from the B-stage resin by breaking up the B-stage resin and heating the resin at a temperature from 210° C.–245° C. Generally, the preferred temperature for reacting the resin to the C-Stage is from 220° C. to 245° C. The optimum cure for any particular resin at a particular temperature is determined empirically by testing the structural strength of samples over a range of cure times.

Adding a metal or salt substantially enhances the reaction rate. Stannous chloride enhances the reaction rate the most, reducing the reaction time from many days to a few hours in some cases.

In adding a metal or salt to co-ordinate the phthalocyanine nuclei, the metal or salt is added in a stoichiometric amount while the dicyanophenoxyalkane is molten or powdered. If the amount of metal or salt is less than stoichiometric, i.e., less than one equivalent per two equivalents of the precursor, the resulting resin is not completely coordinated with the salt or metal. An amount in excess of stoichiometry would cause the resin to have unreacted metal or salt in it. Avoiding the presence of any unreacted salt or metal is particularly important with the synthesis of the present resins on acount of the high temperature needed for polymerization.

High temperatures further require a high degree of purity on account of the increased reactivity of all species present including the impurities. The preferred amounts of impurities are less than 100 ppm. However, impurities can be present in amounts up to 900 ppm without noticeably affecting the quality of the final resin.

As with previous polyphthalocyanine resins, the dispersion of the salt or metal is affected by the particle size. Since the resin is formed at such high temperatures, dispersion becomes particularly critical. Consequently, particle sized up to 1000 micrometers are preferred.

If stannous chloride is used to co-ordinate the resin, the stannous chloride must be introduced into the metal as stannous chloride dihydrate by the following method. The stannous chloride dihydrate ($SnCl_2.2H_2O$) is added as a melt or powder. The mixture is heated, while being stirred, to about 130° C. or higher until all water is expelled from the mixture and if the phthalonitrile is molten, then the mixture is kept at the melt temperature until all water is expelled. The mixture is then reacted either to the B-stage or C-stage in the manner previously described.

Examples of the preparation of terminated dicyanophenoxyalkane and polyphthalocyanines of this invention are herein given. These examples are given by way of explanation and are not meant to limit the disclosure or the claims to follow in any manner.

EXAMPLE 1

Synthesis of 1,6-Bis(3,4-Dicyanophenoxy) Hexane Using Anhydrous Potassium Carbonate (Weak Base) in Dimethyl Sulfoxide.

A mixture of 1.6-hexanediol (1.2 g, 0.01 mol), 4-nitrophthalonitrile (3.4 g, 0.02 mol), anhydrous potassium carbonate (6.9 g, 0.05 mol) and 20 ml of dry dimethyl sulfoxide was flushed with nitrogen for 15 minutes and heated at 75°–80° C. for 7 hours under a nitrogen atmosphere. The potassium carbonate was added in 3 portions. After cooling, the dark product mixture was poured into 150 ml of cold dilute hydrochloric acid. The aqueous solution was extracted with four, 50 ml portions of chloroform. The combined extract was washed several times with water, dried over anhydrous sodium sulfate, charcoaled, filtered and concentrated to afford 3.1 g of a viscous oil which crystallized on standing. Recrystallization from acetonitrile-water yielded 1.9 g (51%): m.p. 143°–145° C., of 1,6-bis (3,4-dicyanophenoxy) hexane.

EXAMPLE 2

Synthesis of 1,12-Bis(3,4-Dicyanophenoxy) Dodecane Using Anhydrous Potassium Carbonate in Dimethyl Sulfoxide.

A mixture of 1,12-dodecanediol (20.4 g, 0.10 mol), 4-nitrophthalonitrile (35 g, 0.20 mol), anhydrous potassium carbonate (69 g, 0.50 mol) and 180 ml of dimethyl sulfoxide was heated at 70°–75° C. for 6 hours under a nitrogen atmosphere. The potassium carbonate was added in three portions. After cooling, the content was slowly poured into 500 ml of cold dilute (2 N) hydrochloric acid. The aqueous solution was extracted with four, 100 ml portions of chloroform. The combined extract was washed several times with water, charcoaled, dried over anhydrous sodium sulfate and concentrated to afford 42 g of crude product. Recrystallization from ethanol-water yielded 24.4 g (54%), m.p. 104°–107° C. of 1,12-bis(3,4-dicyanophenoxy) dodecane.

EXAMPLE 3

Synthesis of 1,12-Bis(3,4-Dicyanophenoxy) Dodecane Using Sodium Hydroxide in Dimethyl Sulfoxide.

A mixture of 1,12-dodecanediol (10.2 g, 0.051 mol), sodium hydroxide (4.6 g, 0.11 mol), 120 ml of dimethyl sulfoxide, 20 ml of benzene and 6 ml of water was stirred at reflux under a nitrogen atmosphere for 12 hours. The water was azeotroped from the mixture with a Dean-Stark trap. After cooling, 17.5 g (0.11 mol) of 4-nitrophthalonitrile was added to the disodium salt of 1,12-dodecanediol prepared above. The resulting mixture was slowly heated to 140° C. and stirred at this temperature for 8 hours. The cooled reaction mixture was poured into 400 ml of cold water. The aqueous solution was extracted with three, 75 ml portions of methylene chloride. The combined extract was washed with water, charcoaled, and dried over anhydrous sodium sulfate and concentrated at reduced pressure. Recrystallization from ethanol-water yielded 10.1 g (45%) of 1,12-bis(3,4-dicyanophenoxy) dodecane.

EXAMPLE 4

Synthesis of 1,12-Bis(3,4-Dicyanoxphenoxy)Dodecane Using Sodium Hydride in Dimethylformamide.

A mixture of 1,12-dodecanediol (2,2 g, 0.011 mol), sodium hydride (0.91 g. 0.023 mol, 61%) and 25 ml of dry dimethylformamide were stirred under a nitrogen atmosphere at 90°–95° C. for 12 hours. After cooling, 4.0 g (0.23 mol) of 4-nitrophthalonitrile was added to the white salt mixture. The salt dissolved quickly and the mixture was heated at 100°–110° C. for 4 hours. Infrared analysis indicated that a large quantity of 4-nitrophthalonitrile was still present. The temperature was increased to 140°–145° C. and the mixture was stirred at this temperature for 15 hours. The cooled reaction mixture was poured into 200 ml of cold water and the product was extracted into three, 75 ml portions of methylene chloride. The combined extract was washed several times with water, charcoaled, dried over anhydrous sodium sulfate, and concentrated at reduced pressure. Recrystallization of the crude material from ethanol-water yielded 1.7 g (40%) of 1,12-bis(3,4-dicyanophenoxy) dodecane.

EXAMPLE 5

Synthesis of 1,12-Bis(3,4-Dicyanophenoxy) Dodecane Using Anhydrous Potassium Carbonate in Dimethylformamide.

A mixture of 1,12-dodecanediol (2.2 g, 0.011 mol), anhydrous potassium carbonate (4.1 g, 0.031 mol), 35 ml of dimethylformamide and 5 ml of benzene was heated at reflux under a nitrogen atmosphere for 12 hours. A small quantity of water was collected in a Dean-Stark trap. The benzene was removed by distillation. To the cooled reaction medium was added 4.0 g (0.023 mol) of 4-nitrophthalonitrile, which resulted in an immediate color change to a deep blue. After 10 minutes at room temperature, the reaction medium had turned to a yellowish-orange and remained this color throughout the entire reaction. The mixture was stirred and heated at 100° C. for 16 hours under a nitrogen atmosphere. The cooled reaction mixture was poured into 200 ml of cold dilute hydrochloric acid and extracted with three 75 ml portions of chloroform. The combined extract was washed with water, dried over anhydrous sodium sulfate, charcoaled and concentrated at reduced pressure. Recrystallization of the crude produced from ethanol-water yielded 3.1 g (70%) of 1,12-bis(3,4-dicyanophenoxy) dodecane.

EXAMPLE 6

Synthesis of 1,16-Bis(3,4Dicyanophenoxy) Hexadecane Using Anhydrous Potassium Carbonate in Dimethyl Sulfoxide.

A mixture of 1,16-hexadecanediol (3.9 g, 0.015 mol), 4-nitrophthalonitrile (5.2 g, 0.030 mol), anhydrous potassium carbonate (7.5 g, 0.054 mol) and 30 ml of dry dimethyl sulfoxide was stirred and heated at 70°–80° C. for 15 hours under a nitrogen atmosphere. The cooled reaction medium was slowly poured into 200 ml of cold dilute hydrochloric acid. The acidic, aqueous mixture was extracted with three, 75 ml portions of chloroform. The combined extract was washed with water until neutral, dried over anhydrous sodium sulfate, charcoaled and concentrated at reduced pressure. Recrystallization of the crude material from ethanol-water yielded 4.3 g (57%), m.p. 70°–72° C., of 1,16-bis (3,4-dicyanophenoxy) hexadecane.

EXAMPLE 7

Polymerization of 1,6-Bis(3,4-Dicyanophenoxy) Hexane.

A sample (0.32 g) of 1,6-bis (3,4-dicyanophenoxy) hexane was heated at 220° C. for 48 hours in a small test tube. Gelation was extremely slow (30 hours) at this temperature. The polymeric material was then heated at 240° C. for 24 hours to ensure complete polymerization. The higher temperature postcure enhanced the toughness of the material.

EXAMPLE 8

Polymerization of 1,12-Bis(3,4-Dicyanophenoxy) Dodecane.

A sample (1.5 g) of 1,12-bis (3,4-dicyanophenoxy) dodecane was melted and heated at 240° C. for 24 hours. Gelation occurred after 6 hours at this temperature.

EXAMPLE 9

Polymerization of 1,12-Bis(3,4-Dicyanophenoxy) Dodecane with Stannous Chloride Dihydrate.

A mixture of 1,12-bis(3,4-dicyanophenoxy) dodecane (1.5 g, 3.3 mmol) and stannous chloride dihydrate (0.36 g, 1.6 mmol) were placed in a test tube. The monomer melted at 105°–110° C. At 170°–175° C. the salt ($SnCl_2$) dissolved and the reaction medium became green immediately (B-stage). The temperature was increased to 215° C. and the sample was heated at this temperature for 24 hours. Gelation had occurred after 15 minutes at 215° C.

EXAMPLE 10

Polymerization of 1,16-Bis(3,4-Dicyanophenoxy) Hexadecane.

A sample (0.41 g) of 1,16-bis(3,4-dicyanophenoxy) hexadecane was placed in a test tube and heated at 220° C. for 12 hours and postcured at 240° C. for 24 hours. Gelation had occurred after 4 hours at 220° C.

The preparation of $\alpha,\omega$-bis(3,4-dicyanophenoxy) alkanes occurs more readily and in a higher yield from the dipotassium salts than the disodium salts of $\alpha,\omega$-alkanediols. This phenonmen could be due to the more ionic nature of the potassium salts and their greater solvation in the solvent medium. Dimethylformamide is the preferred solvent due to the cleanness of the reaction medium and to the ease of purification of the product.

When the $\alpha,\omega$-bis(3,4-dicyanophenoxy) alkanes are heated in the absence or presence of metallic additives, polymerization occurs easier and more readily as the distance between the two terminal phthalonitrile moieties increases. Preliminary results also show an enhancement in the toughness of the polymeric materials as the length of the spacing unit is achieved.

Three samples of the polyphthalocyanine of the formula $[PcO_4((CH_2)_{12})_2]_n$ prepared by the method of Example 8 were tested for thermal stability by heating one to 250° C., another to 240° C., and the third to 230° C. The sample heated at 250° C. began to decompose after 1500 hours of continuous heating with a 10 percent less of weight after 600 hours. The sample heated at 240° C. showed a 5 percent loss of weight after about 1000 hours and the sample heated at 230° C. showed no loss of weight after 1000 hours. A sample of $[SnCl_2.PcO_4((CH_2)_{12})_2]_n$ prepared by the method of Example 9 showed a 5 percent weight loss after 1000 hours of heating at 240° C.

A flame test which comprises placing a sample into a flame of 500° C. until combustion has been initiated and then removing the sample showed that $[SnCl_2.PcO_4((CH_2)_{12})_2]_n$ was self-extinguishing while $(PcO_4(CH_2)_{12})_n$ was not. By the term "self-extinguishing," it is meant that a sample does not continue to burn once removed from a flame.

Samples similar to the above were tested by the water-soak method which comprises submerging samples in water and periodically testing the samples for weight gain. Both polyphthalocyanines tested equally well with both showing a maximum water absorption of 1.4 weight present after 3000 hours with no additional weight gain after 2800 hours. In contrast, amide-bridged polyphthalocyanines have a water absorption of about six percent.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A terminated dicyanophenoxy alkane of the general formula:

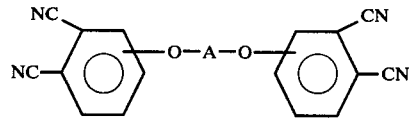

wherein A is an alkylene with a length from 2 to 30 carbon atoms provided that the $\alpha$- and $\beta$-carbon atoms are not substituted and that no branching chain is more than five carbon atoms in length.

2. The dicyanophenoxy alkane of claim 1 wherein A is a non-branched alkeylene.

3. The dicyanophenoxy alkane of claim 2 wherein said alkylene is from 2 to 6 carbon atoms in length.

4. The dicyanophenoxy of claim 2 wherein said alkylene is from 8 to 20 carbon atoms in length.

5. The dicyanophenoxy of claim 2 wherein said alkylene is from 15 to 30 carbon atoms in length.

6. The dicyanophenoxy of claim 1 wherein said alkylene is branched.

7. The dicyanophenoxy of claim 6 wherein the carbon atoms of the primary chain of said alkylene except for the $\alpha$-$\beta$ carbon atoms are substituted twice by ethyl groups.

8. The dicyanophenoxy of claim 7 wherein said alkylene is from 8 to 20 carbon atoms in length.

* * * * *